US012778223B2

(12) United States Patent
Duffy

(10) Patent No.: US 12,778,223 B2
(45) Date of Patent: Nov. 3, 2026

(54) RESPIRATOR INCLUDING ADJUSTABLE STRAP AND METHOD OF FORMING SAME

(71) Applicant: 3M INNOVATIVE PROPERTIES COMPANY, St. Paul, MN (US)

(72) Inventor: Dean R. Duffy, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 795 days.

(21) Appl. No.: 17/275,348

(22) PCT Filed: Sep. 11, 2019

(86) PCT No.: PCT/IB2019/057659
§ 371 (c)(1),
(2) Date: Mar. 11, 2021

(87) PCT Pub. No.: WO2020/053786
PCT Pub. Date: Mar. 19, 2020

(65) Prior Publication Data

US 2022/0047015 A1 Feb. 17, 2022

Related U.S. Application Data

(60) Provisional application No. 62/731,202, filed on Sep. 14, 2018.

(51) Int. Cl.
*A41D 13/11* (2006.01)
*A62B 23/02* (2006.01)

(52) U.S. Cl.
CPC ........ *A41D 13/1161* (2013.01); *A62B 23/025* (2013.01)

(58) Field of Classification Search
CPC . A41D 13/11; A41D 13/1107; A41D 13/1115; A41D 13/1123; A41D 13/13;
(Continued)

(56) References Cited

U.S. PATENT DOCUMENTS 2,162,551 A * 6/1939 Hawley, Jr. ............ D06B 23/00 427/389.9
3,962,757 A * 6/1976 Gedney .............. B65D 33/1625 24/72.5

(Continued)

FOREIGN PATENT DOCUMENTS

CN 204245205 U 10/2014
CN 105077760 11/2015

(Continued)

OTHER PUBLICATIONS https://www.merriam-webster.com/dictionary/buckle (Year: 2024).*

(Continued)

*Primary Examiner* — Alireza Nia
*Assistant Examiner* — Michael Milo
(74) *Attorney, Agent, or Firm* — Aleksander Medved; Melissa E. Buss

(57) ABSTRACT

Various embodiments of a filtering face-piece respirator and a method of forming such respirator are disclosed. The filtering face-piece respirator includes a mask body having a filtering structure and an attachment region disposed on the mask body that includes a connected portion and an aperture disposed in the connected portion. Two or more layers of the filtering structure are connected together to form the connected portion. The filtering face-piece respirator further includes an adjustable strap having a first end and a second end, where the first end of the strap is threaded through the aperture of the attachment region such that the strap is connected to the attachment region. The aperture mechanically retains the strap.

19 Claims, 7 Drawing Sheets

(58) Field of Classification Search
CPC ............ A41D 13/1138; A41D 13/1146; A41D 13/1161; A41D 13/1169; A41D 13/1192; A62B 18/00; A62B 18/02; A62B 18/025; A61F 13/12; A61F 13/122; A61F 13/126; A61F 9/02; A61F 9/026; A61F 9/027; A61F 9/028; A61F 9/029
USPC .......................................................... 128/863
See application file for complete search history.

(56) References Cited

U.S. PATENT DOCUMENTS

| | | | | | |
|---|---|---|---|---|---|
| 4,807,619 | A * | 2/1989 | Dyrud | B01D 39/163 | 128/206.16 |
| 6,123,077 | A * | 9/2000 | Bostock | A41D 13/1115 | 128/206.19 |
| 2005/0051172 | A1* | 3/2005 | Lee | A41D 13/1161 | 128/206.19 |
| 2012/0047614 | A1* | 3/2012 | Choi | A41D 13/1161 | 2/9 |
| 2015/0059773 | A1* | 3/2015 | Duffy | A41D 13/11 | 29/896.62 |
| 2016/0138221 | A1* | 5/2016 | Botelho | B29C 65/7443 | 428/190 |
| 2017/0303608 | A1 | 10/2017 | Chen et al. | | |

FOREIGN PATENT DOCUMENTS

| | | | | |
|---|---|---|---|---|
| EP | 1495785 | | 1/2005 | |
| GB | 978962 | | 12/1963 | |
| JP | H10286319 | A * | 10/1998 | |
| JP | H11206896 | A * | 8/1999 | A62B 18/02 |
| WO | 96282216 | | 9/1996 | |
| WO | 2009109770 | | 9/2009 | |
| WO | 2016058165 | | 4/2016 | |
| WO | WO-2016058163 | A1 * | 4/2016 | A41D 13/113 |
| WO | 2019135150 | | 7/2019 | |

OTHER PUBLICATIONS

Davies, C.N., The Separation of Airborne Dust Particles, Institution of Mechanical Engineers, Lond, Porceedings 1B, 1952.
ISR For PCT-IB2019-057659_3pgs.
Wente, Van A., Superfine Thermoplastic Fibers, 48 Indus. Eng. Chem., 1342 et seq., 1956.

* cited by examiner

RESPIRATOR INCLUDING ADJUSTABLE STRAP AND METHOD OF FORMING SAME

BACKGROUND

Respirators are commonly worn over a person's breathing passages in at least one of two situations: (1) to prevent impurities or contaminants from entering the wearer's respiratory system; and (2) to protect other persons or things from being exposed to pathogens and other contaminants exhaled by the wearer. In the first situation, the respirator is worn in an environment where the air contains particles that may be harmful to the wearer, for example, in an auto body shop. In the second situation, the respirator is worn in an environment where there is risk of contamination to other persons or things, for example, in an operating room or clean room.

A variety of respirators have been designed to be used in one or both of these situations. Some of these respirators have been categorized as being "filtering face-pieces" because the mask body itself functions as the filtering mechanism. Unlike respirators that use rubber or elastomeric mask bodies with attachable filter cartridges (see, e.g., U.S. Pat. No. RE39,493 to Yuschak et al.) or insert-molded filter elements (see, e.g., U.S. Pat. No. 4,790,306 to Braun), filtering face-piece respirators are designed to have the filter media cover much of the mask body so that there is no need for installing or replacing a filter cartridge. These filtering face-piece respirators commonly come in one of two configurations: molded respirators and flat-fold respirators.

Molded filtering face-piece respirators often include nonwoven webs of thermally-bonded fibers or open-work plastic meshes to furnish the mask body with its cup-shaped configuration. Molded respirators tend to maintain the same shape during both use and storage. These respirators, therefore, cannot be folded flat for storage and shipping. Examples of patents that disclose molded, filtering, face-piece respirators include U.S. Pat. No. 7,131,442 to Kronzer et al; U.S. Pat. Nos. 6,923,182 and 6,041,782 to Angadjivand et al.; U.S. Pat. No. 4,807,619 to Dyrud et al.; and U.S. Pat. No. 4,536,440 to Berg.

Flat-fold respirators, as the name implies, can be folded flat for shipping and storage. Such respirators can be opened into a cup-shaped configuration for use. Examples of flat-fold respirators are described in U.S. Pat. Nos. 6,484,722 and 6,568,392 to Bostock et al., and U.S. Pat. No. 6,394,090 to Chen. Some flat-fold respirators have been designed with weld lines, seams, and folds to help maintain their cup-shaped configuration during use. Stiffening members have also been incorporated into panels of the mask body. See, e.g., U.S. Patent Publication Nos. 2001/0067700 and 2010/0154805 to Duffy et al., and U.S. Design Pat. No. 659,821 to Spoo et al.

Flat-fold respirators have two general orientations when folded flat for storage. In one configuration—sometimes referred to as a "horizontal" flat-fold respirator—the mask body is folded crosswise such that it has an upper portion and a lower portion. A second type of respirator is referred to as a "vertical" flat-fold respirator because the primary fold is oriented vertically when the respirator is viewed from the front in an upright position. Vertical flat-fold respirators have left and right portions on opposing sides of the vertical fold or a centerline of the mask body.

Filtering face-piece respirators of the kinds described typically include several different components that are joined or assembled together to make an integral unit. These components may include harnesses or straps, exhalation valves, face seals, nose clips, and the like. For example, face seal components are regularly added because they provide a comfortable fit between differing contours of a wearer's face and the respirator mask body and also to accommodate dynamic changes that might render the seal ineffective, such as when a wearer's face is moving while the wearer is speaking.

Typically, one or more straps are used to hold the filtering face-piece respirator snugly against the wearer's face. These straps are commonly adhered, welded, or stapled directly to the mask body. Some filtering face-piece respirators, however, use buckles to allow the strap length to be adjusted. The buckles too are adhered, welded, or stapled to the mask body.

SUMMARY

In general, the present disclosure provides various embodiments of a respirator and a method of forming such respirator. The respirator can include an attachment region disposed on a mask body of the respirator, where the attachment region includes a connected portion and an aperture disposed in the connected portion. The respirator can also include an adjustable strap. The first end of the strap can be threaded through the aperture of the attachment region such that the strap is connected to the attachment region. In one or more embodiments, the aperture of the attachment region mechanically retains the strap. Further, in one or more embodiments, the attachment region can include a patch having a first end portion and a second end portion that are connected to the mask body. The patch can also include an unattached central portion between the first and second end portions that forms an aperture between the patch and the mask body. The first end of the adjustable strap can be threaded through the aperture formed by the patch such that the strap is connected to the attachment region and mechanically retained by the aperture.

In one aspect, the present disclosure provides a filtering face-piece respirator that includes a mask body having a filtering structure and an attachment region disposed on the mask body that includes a connected portion and an aperture disposed in the connected portion. Two or more layers of the filtering structure are connected together to form the connected portion. The filtering face-piece respirator further includes an adjustable strap having a first end and a second end, where the first end of the strap is threaded through the aperture of the attachment region such that the strap is connected to the attachment region. The aperture mechanically retains the strap.

In another aspect, the present disclosure provides a method of forming a respirator that includes disposing an attachment region on a mask body of filtering face-piece respirator. Disposing the attachment region includes connecting together two or more layers of a filtering structure of the mask body to form a connected portion, and disposing an aperture in the connected portion of the attachment region.

In another aspect, the present disclosure provides a filtering face-piece respirator that includes a mask body having a filtering structure and an attachment region disposed on the mask body that includes a patch having first and second end portions that are connected to the mask body and an unattached central portion that forms an aperture between the patch and the mask body.

In another aspect, the present disclosure provides a method of making a flat-fold respirator. The method includes forming a mask body blank, connecting a buckle patch strip to the mask body blank to form an aperture between the buckle patch strip and the mask body blank, and threading an end of a strap through the aperture such that the strap is connected to the mask body blank.

All headings provided herein are for the convenience of the reader and should not be used to limit the meaning of any text that follows the heading, unless so specified.

The terms “comprises” and variations thereof do not have a limiting meaning where these terms appear in the description and claims. Such terms will be understood to imply the inclusion of a stated step or element or group of steps or elements but not the exclusion of any other step or element or group of steps or elements.

In this application, terms such as “a,” “an,” and “the” are not intended to refer to only a singular entity but include the general class of which a specific example may be used for illustration. The terms “a,” “an,” and “the” are used interchangeably with the term “at least one.” The phrases “at least one of” and “comprises at least one of” followed by a list refers to any one of the items in the list and any combination of two or more items in the list.

The phrases “at least one of” and “comprises at least one of” followed by a list refers to any one of the items in the list and any combination of two or more items in the list.

As used herein, the term “or” is generally employed in its usual sense including “and/or” unless the content clearly dictates otherwise.

The term “and/or” means one or all of the listed elements or a combination of any two or more of the listed elements.

As used herein in connection with a measured quantity, the term “about” refers to that variation in the measured quantity as would be expected by the skilled artisan making the measurement and exercising a level of care commensurate with the objective of the measurement and the precision of the measuring equipment used. Herein, “up to” a number (e.g., up to 50) includes the number (e.g., 50).

Also herein, the recitations of numerical ranges by endpoints include all numbers subsumed within that range as well as the endpoints (e.g., 1 to 5 includes 1, 1.5, 2, 2.75, 3, 3.80, 4, 5, etc.).

Still further, the suffixes “a” and “b” may be used throughout this description to denote various left- and right-side parts/features, respectively. However, in most pertinent respects, the parts/features denoted with “a” and “b” suffixes are substantially identical to, or mirror images of, one another. It is understood that, unless otherwise noted, the description of an individual part/feature (e.g., part/feature identified with an “a” suffix) also applies to the opposing part/feature (e.g., part/feature identified with a “b” suffix). Similarly, the description of a part/feature identified with no suffix may apply, unless noted otherwise, to both the corresponding left and right part/feature.

Glossary

The terms set forth herein will have the meanings as defined:

“breathable zone” means a zone or region of the respirator that permits a transport of air from the exterior gas space to the interior gas space and vice versa;

“clean air” means a volume of atmospheric ambient air that has been filtered to remove at least a portion of contaminants disposed in the atmospheric ambient air;

“contaminants” means particles (including dusts, mists, and fumes) and/or other substances that generally may not be considered to be particles (e.g., organic vapors, etc.) but that may be suspended in air;

“crosswise dimension” is the dimension that extends laterally across the respirator, from side-to-side when the respirator is viewed from the front;

“cup-shaped configuration” and variations thereof mean any vessel-type shape that is capable of adequately covering the nose and mouth of a wearer;

“elastic” in reference to a strap of a harness or earloop means being able to be stretched at least 100% and return essentially to the original dimension without imparting damage to the strap;

“exterior gas space” means the ambient atmospheric gas space into which exhaled gas enters after passing through and beyond the mask body and/or exhalation valve;

“exterior surface” means the surface of the mask body exposed to ambient atmospheric gas space when the mask body is positioned on the wearer’s face;

“face seal” means a part(s) located between the mask body and a wearer’s face at one or more locations where the mask body would otherwise contact the face;

“filtering face-piece” means that the mask body itself is designed to filter air that passes through it; there are no separately identifiable filter cartridges or insert-molded filter elements attached to or molded into the mask body to achieve this purpose;

“filter” or “filtration layer” means one or more layers of air-permeable material, which layer(s) is adapted for the primary purpose of removing contaminants (such as particles) from an air stream that passes through it;

“filter media” means an air-permeable structure that is designed to remove contaminants from air that passes through it;

“filtering structure” means a generally air-permeable construction that filters air;

“flat-fold” means that the respirator can be folded flat for storage and opened for use;

“harness” means a structure or combination of parts that assists in supporting the mask body on a wearer’s face;

“integral” means being manufactured together at the same time; that is, being made together as one part and not two separately manufactured parts that are subsequently joined together;

“interior gas space” means the space between a mask body and a wearer’s face;

“interior surface” means the surface of the mask body closest to a wearer’s face when the mask body is positioned on the wearer’s face;

“joined to” means secured to directly or indirectly;

“line of demarcation” means a fold, seam, weld line, bond line, stitch line, hinge line, and/or any combination thereof;

“mask body” means an air-permeable structure that is designed to fit over the nose and mouth of a wearer and that helps define an interior gas space separated from an exterior gas space (including the seams and bonds that join layers and parts thereof together);

“nose clip” means a mechanical device (other than a nose foam), which device is adapted for use on a mask body to improve the seal at least around a wearer’s nose;

“nose region” means the portion of the mask body that resides over a wearer’s nose when the respirator is worn;

“perimeter” means the outer edge of the mask body, which outer edge would be disposed generally proximate a wearer’s face when the respirator is being donned by a person; a “perimeter segment” is a portion of the perimeter;

“pleat” means a portion that is designed to be or is folded back upon itself;

“polymeric” and “plastic” each means a material that mainly includes one or more polymers and that may contain other ingredients as well;

"respirator" means an air filtration device that is worn by a person to provide the wearer with clean air to breathe;

"side" means an area on the mask body distanced from a plane that bisects the mask body centrally and vertically when the mask body is oriented in an upright position and viewed from the front;

"sinus region" means the nose region and parts or areas of the mask body that reside beneath the wearer's eyes and/or eye orbitals when the respirator is being worn in a proper configuration;

"snug fit" or "fit snugly" means that an essentially air-tight (or substantially leak-free) fit is provided (between the mask body and the wearer's face);

"transversely extending" means extending generally in the crosswise dimension; and "vertical flat-fold respirator" means a respirator having a primary fold that is oriented vertically when the mask is viewed from the front in an upright position.

These and other aspects of the present disclosure will be apparent from the detailed description below. In no event, however, should the above summaries be construed as limitations on the claimed subject matter, which subject matter is defined solely by the attached claims, as may be amended during prosecution.

BRIEF DESCRIPTION OF THE DRAWINGS

Throughout the specification, reference is made to the appended drawings, where like reference numerals designate like elements, and wherein.

DETAILED DESCRIPTION

In general, the present disclosure provides various embodiments of a respirator and a method of forming such respirator. The respirator can include an attachment region disposed on a mask body of the respirator, where the attachment region includes a connected portion and an aperture disposed in the connected portion. The respirator can also include an adjustable strap.

The first end of the strap can be threaded through the aperture of the attachment region such that the strap is connected to the attachment region. In one or more embodiments, the aperture of the attachment region mechanically retains the strap. Further, in one or more embodiments, the attachment region can include a patch having a first end portion and a second end portion that are connected to the mask body. The patch can also include an unattached central portion between the first and second end portions that forms an aperture between the patch and the mask body. The first end of the adjustable strap can be threaded through the aperture formed by the patch such that the strap is connected to the attachment region and mechanically retained by the aperture.

Figure 1:
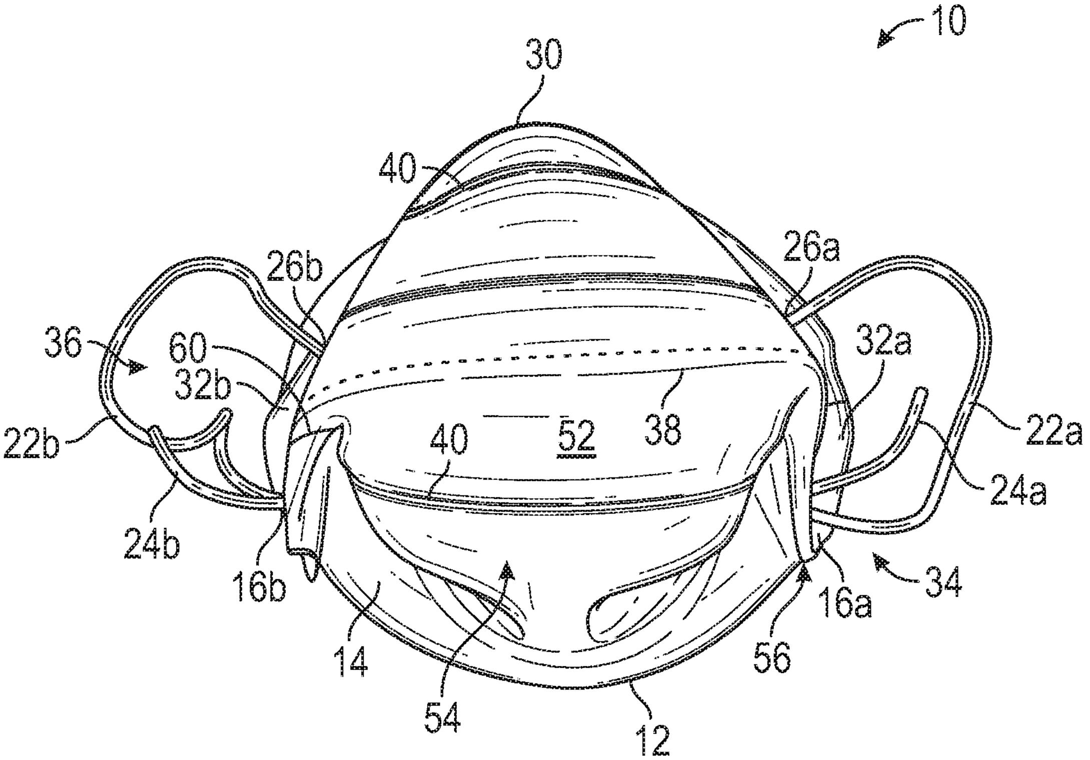
FIG. 1 is a schematic front view of one embodiment of respirator.
Figure 2:
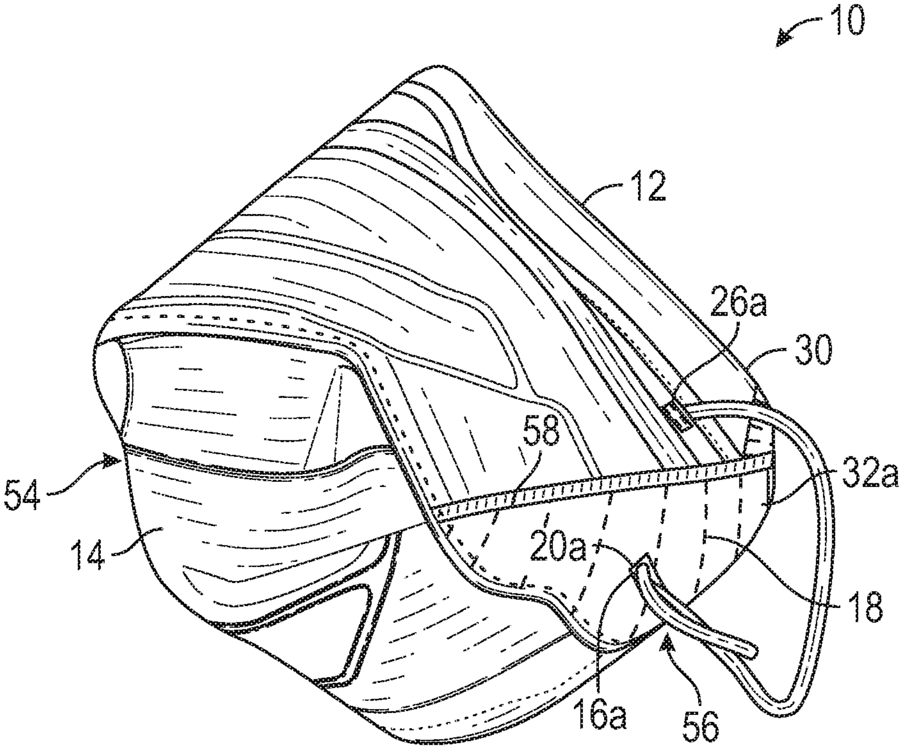
FIG. 2 is a schematic perspective view of the respirator of FIG. 1.
Figure 3:
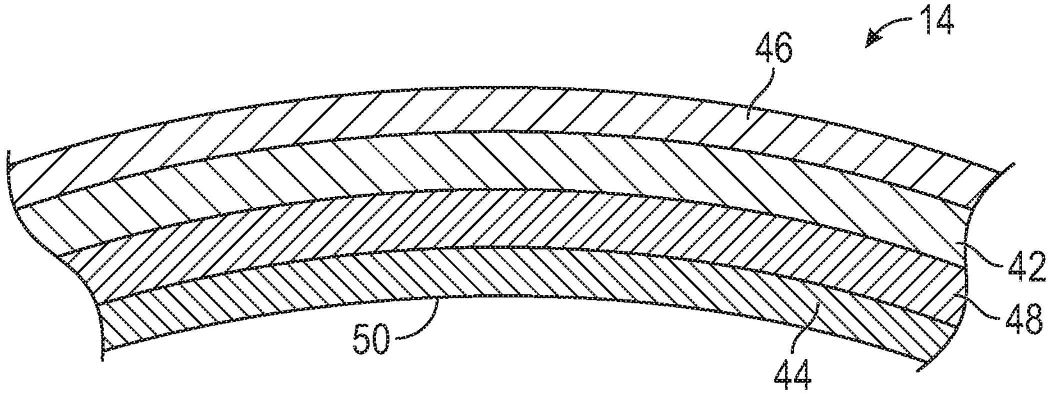
FIG. 3 is a schematic cross-section view of a filtering structure of a mask body of the respirator of FIG. 1.

FIGS. 1-3 are various schematic views of one embodiment of a respirator 10. The respirator 10 includes a mask body 12 that includes a filtering structure 14 and one or more attachment regions 16 disposed on the mask body. In the embodiment illustrated in FIGS. 1-3, the mask body 12 includes a right attachment region **16*a* and a left attachment region 16*b* (collectively referred to as attachment regions 16). As used herein, the terms "right" and "left" refer to portions or elements of the respirator 10 as viewed by an observer when viewing the respirator as worn by a wearer. The right attachment region 16*a* is disposed on a right side 34 of the mask body 12, and the left attachment region 16*b* is disposed on a left side 36 of the mask body 12. Each attachment region 16 includes a connected portion 18 and an aperture 20 disposed in the connected portion. Two or more layers of the filtering structure 14 are connected together to form the connected portion 18. The respirator 10 also includes a right adjustable strap 22*a* and a left adjustable strap 22*b* (collectively referred to as adjustable strap 22). Each adjustable strap 22 includes a first end 24 and a second end 26. The first end 24 of the strap 22 is threaded through the aperture 20 of the attachment region 16 such that the strap is connected to the attachment region. In one or more embodiments, the aperture 20 of each attachment region 16 mechanically retains the strap 22**.

The respirator 10 can include any suitable respirator. In one or more embodiments, the respirator 10 is a filtering face-piece respirator. Any suitable filtering face-piece respirator can be utilized for respirator 10. In one or more embodiments, the filtering face-piece respirator is a horizontal flat-fold respirator. Further, in one or more embodiments, the filtering face-piece respirator is a vertical flat-fold respirator. In one or more embodiments, the filtering face-piece respirator 10 is a three-panel respirator as is further described herein.

Although a filtering face-piece respirator has been illustrated in the present disclosure, the respirator may include a compliable rubber-type mask that has one or more filter cartridges attached to it. See, e.g., U.S. Pat. Nos. RE 39,493 to Yuschak et al. and U.S. Pat. No. 7,650,884 to Flannigan et al. Or it could be a full-face respirator. See, e.g., U.S. Pat. No. 8,067,110 to Rakow et al.; U.S. Pat. No. 7,594,510 to Betz et al.; and D421,118 and D378,610 to Reischel et al.

The mask body 12 of the respirator 10 can include any suitable mask body through at least a portion of which inhaled air passes before entering the wearer's respiratory system. The mask body 12 can remove at least a portion of contaminants from the ambient environment so that the wearer can breathe filtered air. Further, the mask body 12 can take a variety of different shapes and configurations and typically is adapted so that it fits against the wearer's face or within a support structure that contacts the face. In one or more embodiments, the mask body 12 can take a cup shape when the mask body is in an open configuration as shown in FIGS. 1-2.

The mask body 12 can include a breathable zone 54 and a nonbreathable zone 56. The breathable zone 54 of the mask body 12 includes one or more portions of the filtering structure 14 and is adapted for air to traverse this filtering structure between an outer space and an inner space of the respirator 10. In contrast to the breathable zone 54, the nonbreathable zone 56 includes one or more portions of the filtering structure 14 and is adapted such that air does not readily traverse the filtering structure between the outer space and the inner space of the respirator 10.

The mask body 12 can be defined by a perimeter 30. The perimeter 30 can take any suitable shape or shapes. Further, in one or more embodiments, the perimeter 30 can include one or more concave portions as is further described, e.g., in U.S. Patent Publication No. 2008/0271739 to Facer et al. Although not shown, the respirator 10 can also include any suitable face seal material disposed along at least a portion of the perimeter 30 of the mask body 12.

In one or more embodiments, the mask body 12 can also include one or more flanges or tabs 32. In the embodiment illustrated in FIGS. 1-3, the mask body 12 includes a right flange 32*a* and a left flange 32*b* (collectively referred to as flanges 32). Although depicted as including two flanges 32, the mask body 12 can include any suitable number of flanges. Further, the flanges 32 can be connected to the mask body 12 in any suitable location. As illustrated in FIGS. 1-3, the right flange 32*a* extends from the right side 34 of the mask body 12 at a right line of demarcation 58 (FIG. 2) and the left flange 32*b* extends from the left side 36 of the mask body at a left line of demarcation 60. The flanges 32 can include any suitable flange. One exemplary flange is described, e.g., in U.S. Pat. No. D449,377 to Henderson et al.

Each flange 32 can be integral with the mask body 12. In one or more embodiments, one or more flanges 32 can be manufactured separately and then attached to the mask body 12 using any suitable technique or techniques. Further, one or more flanges 32 can include welds or bonds provided thereon to increase flange stiffness.

Further, the mask body 12 can include one or more lines of demarcation 38 that can be formed using any suitable technique or techniques, e.g., folding, welding (e.g., ultrasonic welding), application of pressure (with or without heat), adhering, stitching, and combinations thereof. Further, the lines of demarcation 38 can each be substantially continuous, discontinuous, straight, curvilinear, and combinations thereof. In one or more embodiments, the line of demarcation 38 can include a weld line or seam. The line of demarcation 38 can be disposed on or in the mask body 12 in any suitable location or locations.

The mask body 12 of the respirator 10 can also include one or more additional lines of demarcation 40 (e.g., weld lines) disposed in any suitable location or locations on or in the mask body. The one or more additional weld lines can take any shape or shapes and have any suitable dimensions. In one or more embodiments, additional lines of demarcation such as weld lines can add to the structural stability of the mask body 12.

The mask body 12 can include any suitable filtering structure 14. For example, FIG. 3 is a schematic cross-section view of a portion of the filtering structure 14. The filtering structure 14 that is used in connection with respirators suitable for use with the present disclosure may take on a variety of different shapes and configurations. As shown in FIG. 3, the filtering structure 14 may have a plurality of layers, including a fibrous filtration layer 42, and one or more fibrous cover webs, e.g., an inner cover web 44 and an outer cover web 46. When the respirator 10 is a molded mask, the mask body 12 may also include an optional shaping layer 48 that can be located in any suitable position in the filtering structure. See, e.g., U.S. Pat. No. 6,923,182 to Angadjivand et al.; U.S. Pat. No. 7,131,442 to Kronzer et al.; U.S. Pat. Nos. 6,923,182 and 6,041,782 to Angadjivand et al.; U.S. Pat. No. 4,807,619 to Dyrud et al.; and U.S. Pat. No. 4,536,440 to Berg.

In general, the filtering structure 14 removes at least a portion of contaminants from the ambient air and may also act as a barrier layer that precludes liquid splashes from entering the mask interior. The outer cover web 46 can act to stop or slow any liquid splashes, and the inner filtering structure may then contain them if there is penetration past the other layers. The filtering structure 14 can be of a particle capture or gas and vapor type filter. The filtering structure 14 may include multiple layers of similar or dissimilar filter media and one or more cover webs as the application requires. In one or more embodiments, the respirator 10 can contain a fluid impermeable mask body that has one or more filter cartridges attached to it. See, e.g., U.S Pat. No. 6,874,499 to Viner et al.; U.S. Pat. No. 6,277,178 and D613,850 to Holmquist-Brown et al.; RE39,493 to Yuschak et al.; D652,507, D471,627, and D467,656 to Mittelstadt et al.; and D518,571 to Martin.

The cover webs 44, 46 can be located on the outer sides of the filtering structure 14 to capture any fibers that could come loose therefrom. Typically, the cover webs 44, 46 are made from a selection of fibers that provide a comfortable feel, particularly on a side 50 of the filtering structure 14 that makes contact with the wearer's face. The constructions of various filter layers, shaping layers, and cover webs that may be used with a filtering structure used in a respirator of the present disclosure are described herein in more detail.

Filtration layers that may be beneficially employed in a respirator of the present disclosure are generally low in pressure drop (e.g., less than about 195 to 295 Pascals at a face velocity of 13.8 centimeters per second) to minimize the breathing work of the mask wearer. Filtration layers additionally are flexible and have sufficient shear strength so that they generally retain their structure under the expected use conditions. Examples of particle capture filters include one or more webs of fine inorganic fibers (such as fiberglass) or polymeric synthetic fibers. Synthetic fiber webs may include electret-charged polymeric microfibers that are produced from processes such as meltblowing. Polyolefin microfibers formed from polypropylene that has been electrically charged provide particular utility for particulate capture applications.

The filtration layer 42 is typically chosen to achieve a desired filtering effect. The filtration layer 42 generally will remove a high percentage of particles and/or or other contaminants from the gaseous stream that passes through it. For fibrous filter layers, the fibers selected depend upon the kind of substance to be filtered and, typically, are chosen so that they do not become bonded together during the manufacturing operation. As indicated, the filtration layer may come in a variety of shapes and forms and typically has a thickness of about 0.2 millimeters (mm) to 1 centimeter (cm), more typically about 0.3 mm to 0.5 cm, and it could be a generally planar web, or it could be corrugated to provide an expanded surface area. See, e.g., U.S. Pat. Nos. 5,804,295 and 5,656,368 to Braun et al. The filtration layer 42 also may include multiple filtration layers joined together by an adhesive or any other techniques. Essentially any suitable material that is known (or later developed) for forming a filtering layer may be used as the filtering material. Webs of melt-blown fibers, such as those taught in Wente, Van A., *Superfine Thermoplastic Fibers,* 48 Indus. Eng. Chem., 1342 et seq. (1956), especially when in a persistent electrically charged (electret) form are especially useful (see, e.g., U.S. Pat. No. 4,215,682 to Kubik et al.). These melt-blown fibers may be microfibers that have an effective fiber diameter less than about 20 micrometers (μm) (referred to as BMF for "blown microfiber"), typically about 1 to 12 μm. Effective fiber diameter may be determined according to Davies, C. N., *The Separation of Airborne Dust Particles, Institution of Mechanical Engineers,* London, Proceedings 1B, 1952. Particularly preferred are BMF webs that contain fibers formed from polypropylene, poly(4-methyl-1-pentene), and combinations thereof. Electrically charged fibrillated-film fibers as taught in U.S. Pat. No. Re. 31,285 to van Turnhout also may be suitable, as well as rosin-wool fibrous webs and webs of glass fibers or solution-blown, or electrostatically sprayed fibers, especially in microfiber form. Electric charge can be imparted to the fibers by contacting the fibers with water as disclosed in U.S. Pat. No. 6,824,718 to Eitzman et al.; U.S. Pat. No. 6,783,574 to Angadjivand et al.; U.S. Pat. No. 6,743,464 to Insley et al.; U.S. Pat. No. 6,454,986 and U.S. Pat. No. 6,406,657 to Eitzman et al.; and U.S. Pat. Nos. 6,375,886 and 5,496,507 to Angadjivand et al. Electric charge also may be imparted to the fibers by corona charging as disclosed in U.S. Pat. No. 4,588,537 to Klasse et al., or by tribocharging as disclosed in U.S. Pat. No. 4,798,850 to Brown. Also, additives can be included in the fibers to enhance the filtration performance of webs produced through the hydro-charging process (see U.S. Pat. No. 5,908,598 to Rousseau et al.). Fluorine atoms, in particular, can be disposed at the surface of the fibers in the filter layer to improve filtration performance in an oily mist environment. See, e.g., U.S. Pat. Nos. 6,398,847 B1, 6,397,458 B1, and 6,409,806 B1 to Jones et al. Typical basis weights for electret BMF filtration layers are about 10 to 100 grams per square meter ($g/m^2$). When electrically charged according to techniques described in, e.g., the '507 Angadjivand et al. Patent, and when including fluorine atoms as mentioned in the Jones et al. Patents, the basis weight may be about 20 to 40 $g/m^2$ and about 10 to 30 $g/m^2$, respectively. Additionally, sorptive materials such as activated carbon may be disposed between the fibers and/or various layers that include the filtering structure. Further, separate particulate filtration layers may be used in conjunction with sorptive layers to provide filtration for both particulates and vapors. The sorbent component may be used for removing hazardous or odorous gases from the breathing air. Sorbents may include powders or granules that are bound in a filter layer by adhesives, binders, or fibrous structures. See, e.g., U.S. Pat. No. 6,334,671 to Springett et al. and U.S. Pat. No. 3,971,373 to Braun. A sorbent layer can be formed by coating a substrate, such as fibrous or reticulated foam, to form a thin coherent layer. Sorbent materials may include activated carbons that are chemically treated or not, porous alumna-silica catalyst substrates, and alumna particles. An example of a sorptive filtering structure that may be conformed into various configurations is described in U.S. Pat. No. 6,391,429 to Senkus et al.

The cover webs 44, 46 also can have filtering abilities, although typically not nearly as good as the filtering layer and/or may serve to make a filtering face-piece respirator more comfortable to wear. The cover webs 44, 46 can be made from nonwoven fibrous materials such as spun bonded fibers that contain, e.g., polyolefins, and polyesters. See, e.g., U.S. Pat. No. 6,041,782 to Angadjivand et al.; U.S. Pat. No.4,807,619 to Dyrud et al.; and U.S. Pat. No.4,536,440 to Berg. When a wearer inhales, air is drawn through the mask body, and airborne particles become trapped in the interstices between the fibers, particularly the fibers in the filter layer.

The inner cover web 44 can be used to provide a smooth surface for contacting the wearer's face. Further, the outer cover web 46, in addition to providing splash fluid protection, can be used for entrapping loose fibers in the mask body and for aesthetic reasons. The cover webs 44, 46 typically does not provide any substantial filtering benefits to the filtering structure, although it can act as a pre-filter when disposed on the exterior of (or upstream to) the filtration layer. To obtain a suitable degree of comfort, an inner cover web can have a comparatively low basis weight and can be formed from comparatively fine fibers. More particularly, in one or more embodiments, one or both of the cover webs 44, 46 can be fashioned to have a basis weight of about 5 to 70 $g/m^2$ (typically 10 to 30 $g/m^2$), and the fibers may be less than 3.5 denier (typically less than 2 denier, and more typically less than 1 denier but greater than 0.1 denier). Fibers used in the cover web often have an average fiber diameter of about 5 to 24 micrometers, typically of about 7 to 18 micrometers, and more typically of about 8 to 12 micrometers. The cover web material may have a degree of elasticity (typically, but not necessarily, 100 to 200% at break) and may be plastically deformable.

Suitable materials for the cover webs 44, 46 can be blown microfiber (BMF) materials, particularly polyolefin BMF materials, e.g., polypropylene BMF materials (including polypropylene blends and also blends of polypropylene and polyethylene). And an exemplary process for producing BMF materials for a cover web is described in U.S. Pat. No. 4,013,816 to Sabee et al. The web may be formed by collecting the fibers on a smooth surface, typically a smooth-surfaced drum or a rotating collector. See, e.g., U.S. Pat. No. 6,492,286 to Berrigan et al. Spun-bond fibers also may be used.

A typical cover web may be made from polypropylene or a polypropylene/polyolefin blend that contains 50 weight percent or more polypropylene. These materials have been found to offer high degrees of softness and comfort to the wearer and also, when the filter material is a polypropylene BMF material, to remain secured to the filter material without requiring an adhesive between the layers. Polyolefin materials that are suitable for use in a cover web may include, for example, a single polypropylene, blends of two polypropylenes, and blends of polypropylene and polyethylene, blends of polypropylene and poly(4-methyl-1-pentene), and/or blends of polypropylene and polybutylene. One example of a fiber for the cover web is a polypropylene BMF made from the polypropylene resin "Escorene 3505G" from Exxon Corporation, providing a basis weight of about 25 $g/m^2$and having a fiber denier in the range 0.2 to 3.1 (with an average, measured over 100 fibers of about 0.8). Another suitable fiber is a polypropylene/polyethylene BMF (produced from a mixture comprising 85% of the resin "Escorene 3505G" and 15 percent of the ethylene/alpha-olefin copolymer "Exact 4023" also from Exxon Corporation) providing a basis weight of about 25 $g/m^2$ and having an average fiber denier of about 0.8. Suitable spunbond materials are available under the trade designations "Corosoft Plus 20," "Corosoft Classic 20" and "Corovin PP S 14," from Corovin GmbH of Peine, Germany, and a carded polypropylene/viscose material available, under the trade designation “370/15,” from J. W. Suominen OY of Nakila, Finland. Cover webs typically have very few fibers protruding from the web surface after processing and therefore have a smooth outer surface. Examples of cover webs that may be used in a respirator of the present disclosure are described, e.g., in U.S. Pat. No. 6,041,782 to Angadjivand; U.S. Pat. No. 6,123,077 to Bostock et al.; and PCT Publication No. WO 96/28216A to Bostock et al.

In one or more embodiments, one or both of the inner cover web 44 and outer cover web 46 can include a polymeric netting. Any suitable polymeric netting described herein can be utilized for one or both cover webs. The netting may be made from a variety of polymeric materials. Polymers suitable for netting formation are thermoplastic materials. Examples of thermoplastic polymers that can be used to form polymer netting of the present invention include polyolefins (e.g., polypropylene and polyethylene), polyethylene-vinyl acetate (EVA), polyvinyl chloride, polystyrene, nylons, polyesters (e.g., polyethylene terephthalate), and elastomeric polymers, (e.g., ABA block copolymers, polyurethanes, polyolefin elastomers, polyurethane elastomers, metallocene polyolefin elastomers, polyamide elastomers, ethylene vinyl acetate elastomers, and polyester elastomers). Blends of two or more materials also may be used in the manufacture of nettings. Examples of such blends include polypropylene/EVA and polyethylene/EVA. Polypropylene may be preferred for use in the polymeric netting since melt-blown fibers are regularly made from polypropylene. Use of similar polymers enables proper welding of the support structure to the filtering structure.

The shaping layer(s) 48 may be formed from at least one layer of fibrous material that can be molded to the desired shape with the use of heat and that retains its shape when cooled. Shape retention is typically achieved by causing the fibers to bond to each other at points of contact between them, for example, by fusion or welding. Any suitable material known for making a shape-retaining layer of a direct-molded respiratory mask may be used to form the mask shell, including, for example, a mixture of synthetic staple fiber, e.g., crimped, and bicomponent staple fiber. Bicomponent fiber is a fiber that includes two or more distinct regions of fibrous material, typically distinct regions of polymeric materials. Typical bicomponent fibers include a binder component and a structural component. The binder component allows the fibers of the shape-retaining shell to be bonded together at fiber intersection points when heated and cooled. During heating, the binder component flows into contact with adjacent fibers. The shape-retaining layer can be prepared from fiber mixtures that include staple fiber and bicomponent fiber in weight-percent ratios that may range, for example, from 0/100 to 75/25. In one or more embodiments, the material includes at least 50 weight-percent bicomponent fiber to create a greater number of intersection bonding points, which, in turn, increase the resilience and shape retention of the shell.

Suitable bicomponent fibers that may be used in the shaping layer 48 include, for example, side-by-side configurations, concentric sheath-core configurations, and elliptical sheath-core configurations. One suitable bicomponent fiber is the polyester bicomponent fiber available, under the trade designation “KOSA T254” (12 denier, length 38 mm), from Kosa of Charlotte, N.C., U.S.A., which may be used in combination with a polyester staple fiber, for example, that is available from Kosa under the trade designation “T259” (3 denier, length 38 mm) and possibly also a polyethylene terephthalate (PET) fiber, for example, that available from Kosa under the trade designation “T295” (15 denier, length 32 mm). Alternatively, the bicomponent fiber may include a generally concentric sheath-core configuration having a core of crystalline PET surrounded by a sheath of a polymer formed from isophthalate and terephthalate ester monomers. The latter polymer is heat softenable at a temperature lower than the core material. Polyester has advantages in that it can contribute to mask resiliency and can absorb less moisture than other fibers.

In one or more embodiments, the shaping layer 48 can be prepared without bicomponent fibers. For example, fibers of a heat-flowable polyester can be included together with, e.g., stapled, crimped, fibers in a shaping layer so that, upon heating of the web material, the binder fibers can melt and flow to a fiber intersection point where it forms a mass that upon cooling of the binder material, creates a bond at the intersection point. Staple fibers (for the shaping component) that are pre-treated with Ammonium Polyphosphate-type intumescent FR agents may be used in connection with the present disclosure in addition to or in lieu of a spray-application of the agent. Having the staple fibers contain, or, otherwise being treated with, the agent and then formed into a shell (using binder fibers to hold it together) would be another pathway to employ the agents.

When a fibrous web is used as the material for the shape-retaining shell, the web can be conveniently prepared on a “Rando Webber” air-laying machine (available from Rando Machine Corporation, Macedon, N.Y.) or a carding machine. The web can be formed from bicomponent fibers or other fibers in conventional staple lengths suitable for such equipment. To obtain a shape-retaining layer that has the required resiliency and shape-retention, the layer can have a basis weight of at least about 100 $g/m^2$, although lower basis weights are possible. Higher basis weights, for example, approximately 150 or more than 200 $g/m^2$, may provide greater resistance to deformation and greater resiliency and may be more suitable if the mask body is used to support an exhalation valve. Together with these minimum basis weights, the shaping layer typically has a maximum density of about 0.2 $g/cm^2$ over the central area of the mask. Typically, the shaping layer would have a thickness of about 0.3 to 2.0, more typically about 0.4 to 0.8 millimeters. Examples of shaping layers suitable for use in the present disclosure are described, e.g., U.S. Pat. No. 5,307,796 to Kronzer et al.; U.S. Pat. No. 4,807,619 to Dyrud et al.; and U.S. Pat. No. 4,536,440 to Berg. Staple fibers (for the shaping component) that are pre-treated with Ammonium Polyphosphate-type intumescent FR agents may be used in connection with the present disclosure in addition to or in lieu of a spray-application of the agent. Having the staple fibers contain, or, otherwise being treated with, the agent and then formed into a shell (using binder fibers to hold it together) would be another pathway to employ the agents.

As mentioned herein, the flanges 32 can be made such that they are integral with the mask body 12 and, therefore, can include the same layer or layers and materials as the mask body. For example, one or both of the right and left flanges 32*a*, 32*b* can include at least one of the outer cover web 46, the filtration layer 42, the shaping layer, 48, and the inner cover web 44. In one or more embodiments, at least one of the right and left flanges 32*a*, 32*b* does not include one or more of these layers.

Disposed on or in the mask body 12 is the attachment region 16. The attachment region 16 can be disposed in any suitable location or locations on or in the mask body 12. Further, the respirator 10 can include any suitable number of attachment regions 16. As illustrated in FIGS. 1-2, the respirator 10 includes two attachment regions 16*a*, 16*b* disposed on right and left sides 34, 36 of the mask body 12 respectively. The right attachment region 16*a* can be the same as the left attachment region 16*b*. In one or more embodiments, the right attachment region 16*a* can be different from the left attachment region 16*b*. In one or more embodiments, the attachment region 16 includes or forms a buckle that is integral with the mask body 12.

In the embodiment illustrated in FIGS. 1-2, the right attachment region 16*a* is disposed on the right flange 32*a* and the left attachment region 16*b* is disposed on the left flange 32*b*. In one or more embodiments, the attachment regions 16 can be disposed on the mask body 12. Further, in one or more embodiments, the attachment regions 16 can be disposed adjacent the perimeter 30 of the mask body 12.

Each attachment region 16 includes the connected portion 18 and the aperture 20 disposed in the connected portion. The connected portion 18 can be formed using any suitable technique or techniques. In one or more embodiments, two or more layers of the filtering structure 14 are connected together using any suitable technique or techniques to form the connected portion 18. In one or more embodiments, two or more of the outer cover web 46, filtration layer 42, optional shaping layer 48, and inner cover web 44 can be connected together using any suitable technique or techniques, e.g., welding, ultrasonic welding, adhering using any suitable adhesive, mechanically connecting together using, e.g., staples, sewing, and heat and pressure bonding. The connected portion 18 can take any shape and have any suitable dimensions. In one or more embodiments, an entire surface area of one or both flanges 32 can include the connected portion 18. Further, the connected portion 18 can have any suitable density. In one or more embodiments, the connected portion 18 can have a density of at least 100 gsm. In one or more embodiments, the connected portion 18 can have a density of no greater than 600 gsm.

Disposed in the connected portion 18 is the aperture 20. The aperture 20 can be disposed in any suitable location on or through the connected portion 18. Although illustrated as including one aperture 20, the attachment region 16 can include any suitable number of apertures, e.g., two, three, four, five, or more apertures. Further, the aperture 20 can take any suitable shape or shapes and have any suitable dimensions. In one or more embodiments, the aperture 20 does not extend into the breathable zone 54 of the mask body 12.

The aperture 20 can be adapted to mechanically retain the strap 22 using any suitable technique or techniques. In one or more embodiments, a circumference of the aperture 20 of the attachment region 16 can be less than an outer circumference of the strap 22 such that the strap is mechanically retained by the aperture. Further, in one or more embodiments, the aperture 20 can include a gripping portion that is adapted to adjustably retain the strap 22 within the aperture as is further described herein.

Attached to one or both attachment regions 16 of the mask body 12 is the adjustable strap 22. The strap 22 includes the first end 24 and the second end 26. The first end 24 is threaded through the aperture 20 of the attachment region 16 such that the strap is connected to the attachment region. In one or more embodiments, the second end 26 of the strap 22 can be connected to the mask body 12 in any suitable location using any suitable technique or techniques. In one or more embodiments, the second end 26 of the strap 22 can be connected to the attachment region 16 on the same side of the mask body 12 as the aperture 20 through which the first end 24 of the strap is retained or the other side of the mask body. For example, as shown in FIG. 2, the right strap 22*a* includes the first end 24*a* that is threaded through the aperture 20*a* of the right attachment region 16*a*. The second end 26*a* of the right strap 22*a* is connected to the mask body 12 adjacent the perimeter 30. As used herein, the term "adjacent the perimeter" means that an element or component is disposed closer to the perimeter 30 than to a central region 52 of the mask body 12. In one or more embodiments, the first end 24*a* of the right strap 22*a* can be connected to the right attachment region 16*a,* and the second end 26*a* of the right strap can be connected to the left side 36 of the mask body 12. Similarly, the first end 24*b* of the left strap 20*b* can be connected to the left attachment region 16*b,* and the second end 26*b* of the left strap can be connected to the left side 36 of the mask body adjacent the perimeter 30. In one or more embodiments, the second end 26*b* of the left strap 22*b* can be connected to the right side 34 of the mask body 12.

In one or more embodiments, at least one strap 22 can include an elastic material or materials such that it can be expanded to greater than twice its total length and can be returned to its relaxed state many times throughout the useful life of the respirator. One or both straps 22 also can possibly be increased to three or four times its relaxed state length and can be returned to its original condition without any damage thereto when the tensile forces are removed. In one or more embodiments, the elastic limit thus is not less than two, three, or four times the relaxed-state length of each strap 22. The straps 22 can include any suitable material or combination of materials.

Typically, each strap(s) 22 can be about 10 to 35 cm long, 3 to 20 mm wide, and about 0.3 to 1 mm thick. Each strap 22 can be continuous, or the strap may have a plurality of parts, which can be joined together by further fasteners or buckles. For example, each strap 22 can have first and second parts that are joined together by a fastener that can be quickly uncoupled by the wearer when removing the mask body 12 from the face. In one or more embodiments, each strap 22 may form a loop that is placed around the wearer's head. Examples of fastening or clasping mechanisms that may be used to join one or more parts of the strap together are shown, e.g., in U.S. Pat. No. 6,062,221 to Brostrom et al. and U.S. Pat. No. 5,237,986 to Seppala; and in EP Patent Publication No. 1,495,785A1 to Chen.

The respirator 10 can be formed using any suitable technique or techniques. In one or more embodiments, the attachment regions 16 can be disposed on the mask body 12 of the respirator 10 by connecting together two or more layers of the filtering structure 14 of the mask body to form the connected portion 18. The aperture 20 can be disposed in the connected portion 18 of the attachment region 16 using any suitable technique or techniques, e.g., cutting, slitting, laser cutting, drilling, laser ablation, die cutting, etc. In one or more embodiments, the first end 24 of the adjustable strap 22 can be threaded through the aperture 20 of the attachment region 16 such that the strap is connected to the attachment region and the aperture mechanically retains the strap.

Figure 4:
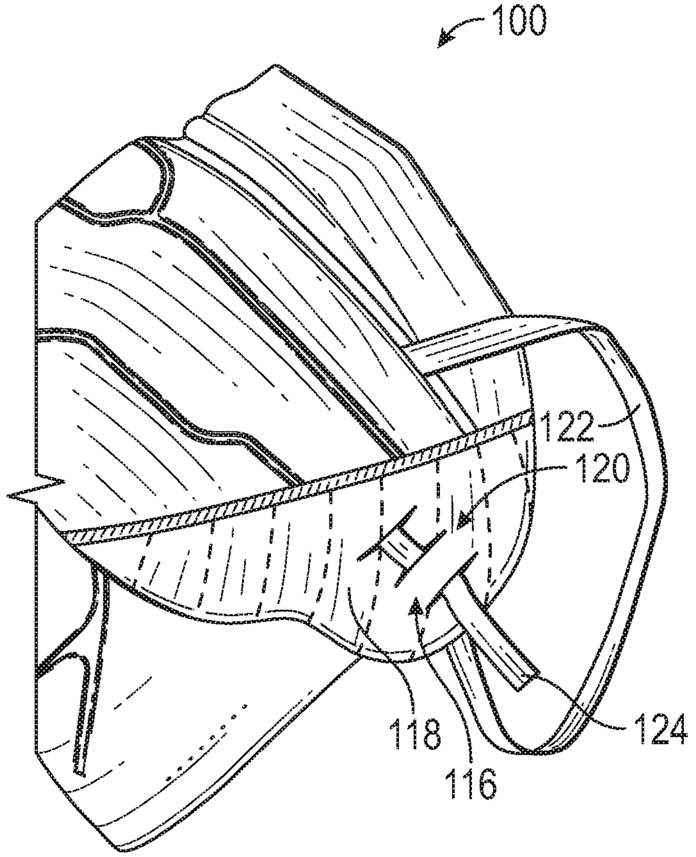
FIG. 4 is a perspective view of a portion of another embodiment of a respirator.
Figure 5:
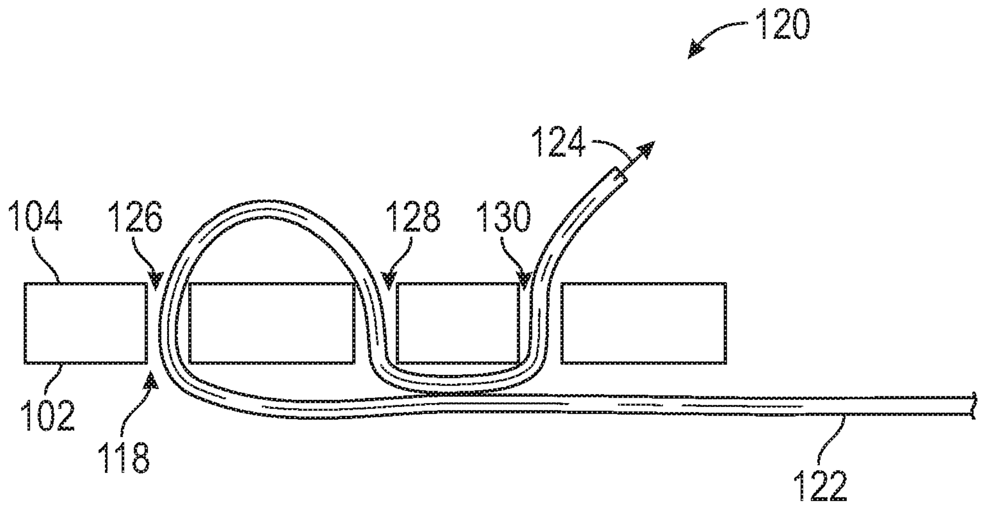
FIG. 5 is a schematic cross-section view of an attachment region of the respirator of FIG. 4.

As mentioned herein, the attachment region 16 can include any suitable number of apertures 20 disposed in the connected portion 18. For example, FIGS. 4-5 are various schematic views of another embodiment of a respirator 100. All of the design considerations and possibilities regarding the respirator 10 of FIGS. 1-3 apply equally to the respirator 100 of FIGS. 4-5. One difference between respirator 100 of FIGS. 4-5 and respirator 10 of FIGS. 1-3 is that attachment region 116 includes connected portion 118 and three apertures 120 disposed in the connected portion. One or more of the apertures 120 can be adapted to mechanically retain strap 122 using any suitable technique or techniques. For example, in one or more embodiments, first end 124 of the strap 122 can be threaded through one or more of the apertures 120 such that the strap is mechanically retained by the attachment region 116.

For example, FIG. 5 is a schematic cross-section view of a portion of the attachment region 116 of respirator 100 of FIG. 4. The first end 124 of the strap 122 is threaded through a first aperture 126 from a bottom surface 102 of the connected portion 118. The first end 124 is then threaded through a second aperture 128 from a top surface 104 of the connected portion 118. Further, the first end 124 is then threaded through a third aperture 130 from the bottom surface 102 of the connected portion 118. The apertures 126, 128, 130 are adapted to mechanically retain the strap 122.

Figure 6:
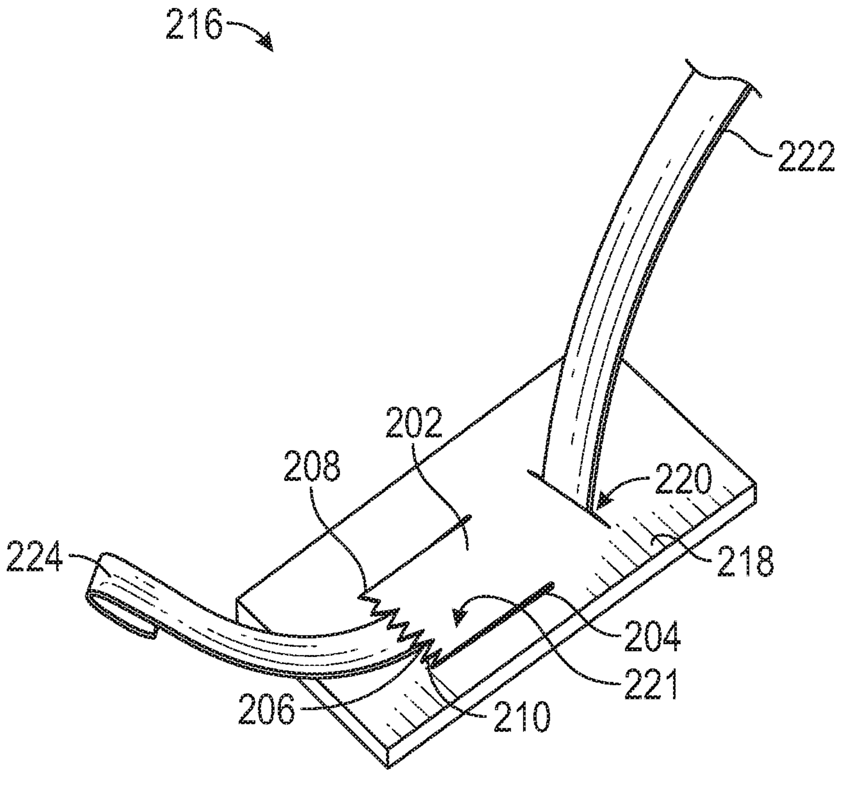
FIG. 6 is a schematic perspective view of an embodiment of an attachment region.

Any suitable technique or techniques can be utilized such that the aperture of the attachment region mechanically retains the strap. For example, FIG. 6 is a schematic perspective view of another embodiment of an attachment region 216. All of the design considerations and possibilities regarding the attachment region 16 of the respirator 10 of FIGS. 1-3 and the attachment region 116 of the respirator 100 of FIGS. 4-5 apply equally to the attachment region 216 of FIG. 6. The attachment region 216 can be utilized with any suitable respirator, e.g., respirator 10 of FIGS. 1-3.

The attachment region 216 includes a connected portion 218. Disposed in the connected portion 218 is a first aperture 220 and a second aperture 221. Each of the first and second apertures 220, 221 can take any suitable shape or shapes. As shown in FIG. 6, the first aperture 220 includes a slit-shaped aperture, and the second aperture 221 is shaped such that it forms a flap 202 disposed in the connected portion 218. The flap 202 has a first end 204 that forms a living hinge with the connected portion 218. The second aperture 221 also includes a gripping portion 206 at a second end 208 of the flap 202. The gripping portion 206 can be adapted to mechanically retain a strap 222. For example, as illustrated in FIG. 6, the gripping portion 206 includes one or more teeth 210 that engage the strap 222 and prevent the strap from being pulled back through the second aperture 221 and the first aperture 220. The gripping portion 206 can include any suitable number of teeth or any other shape that is adapted to mechanically retain the strap 222. For example, in one or more embodiments, the gripping portion 206 can include a single tooth that mechanically engages the strap 222. Further, in one or more embodiments, the gripping portion 206 can include a groove that can grasps the strap 222. Further, the attachment region 216 can include a single aperture, e.g., aperture 221 such that the strap 222 is threaded through the aperture and mechanically retained by the gripping portion 206. To connect the strap 222 to the attachment region 216, a first end 224 of the strap is threaded through the first aperture and then through the second aperture 221 such that it is retained by the gripping portion 206.

Figure 7:
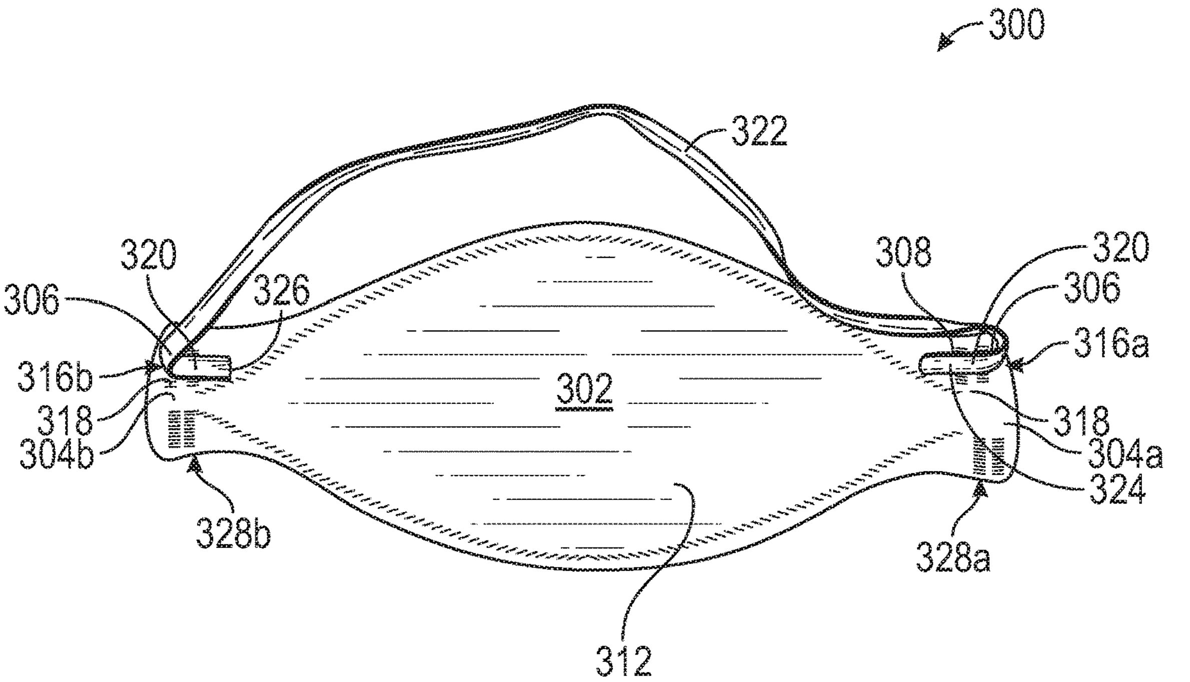
FIG. 7 is a schematic front view of another embodiment of a respirator.
Figure 8:
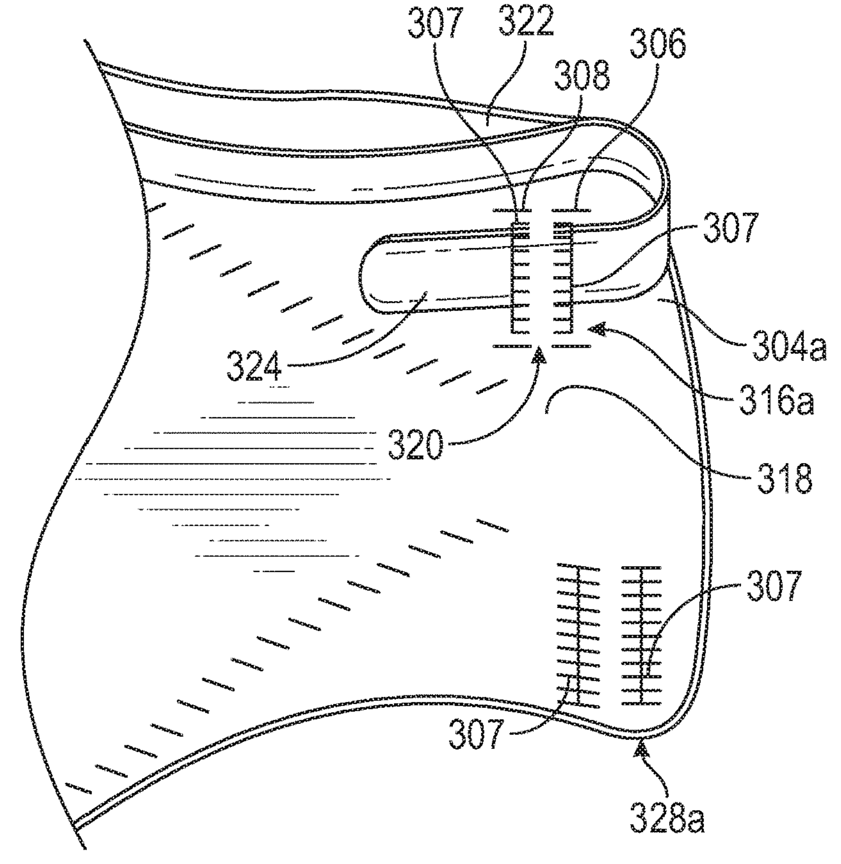
FIG. 8 is a schematic right side view of a portion of the respirator of FIG. 7.

As mentioned herein, one or more attachment regions can be disposed in any suitable location on or in a mask body of a respirator. For example, FIGS. 7-8 are various schematic views of another embodiment of a respirator 300. All of the design considerations and possibilities regarding the respirator 10 of FIGS. 1-3 and the respirator 100 of FIG. 4 apply equally to the respirator 300 of FIGS. 7-8. The respirator 300 includes a three-panel mask body 312 that includes a central panel 302 and top and bottom panels (not shown) connected to the central panel. Any suitable three-panel respirator can be utilized, e.g., the respirators described in U.S. Pat. Nos. 6,568,392 and 6,484,722 to Bostock et al.

The central panel 302 includes a right tab 304*a* and a left tab 304*b*. Disposed on the right tab 304*a* is a right attachment region 316*a* and disposed on the left tab 304*b* is a left attachment region 316*b*. The right and left attachment regions 316*a*, 316*b* (collectively referred to as attachment regions 316) can include any suitable attachment region or regions described herein. Each attachment region 316 each includes a connected portion 318 and an aperture 320. The aperture 320 can be formed using any suitable technique or techniques. As shown in the embodiment illustrated in FIGS. 7-8, the aperture 320 is formed by a first linear weld 306 and a second linear weld 308. One or more slits 307 can be disposed in one or both of the first and second linear welds 306, 308 to provide openings that define the aperture 320. The first and second linear welds 306, 308 form the aperture 320 such that a first end 324 of strap 322 can be threaded through the aperture 320 of the right attachment region 316*a* using any suitable technique or techniques. As shown in FIGS. 7-8, the first end 324 of the strap 322 is threaded through the aperture 320 of the right attachment region 316*a* such that the aperture mechanically retains the strap 322.

One difference between the respirator 300 of FIGS. 7-8 and respirator 10 of FIGS. 1-3 is that a second end 326 of the strap 322 is connected to the left attachment region 316*b* by threading the second end through the aperture 320 of the left attachment region. Another difference is that the respirator 300 can include a second right attachment region 328*a* disposed on the right tab 304*a* and a second left attachment region 328*b* disposed on the left tab 304*b*. The second right and left attachment regions 328*a*, 328*b* can include any suitable attachment regions. Although not shown, a second strap can be connected to the second right and left attachment regions 328*a*, 328*b* using any suitable technique or techniques.

Figure 9:
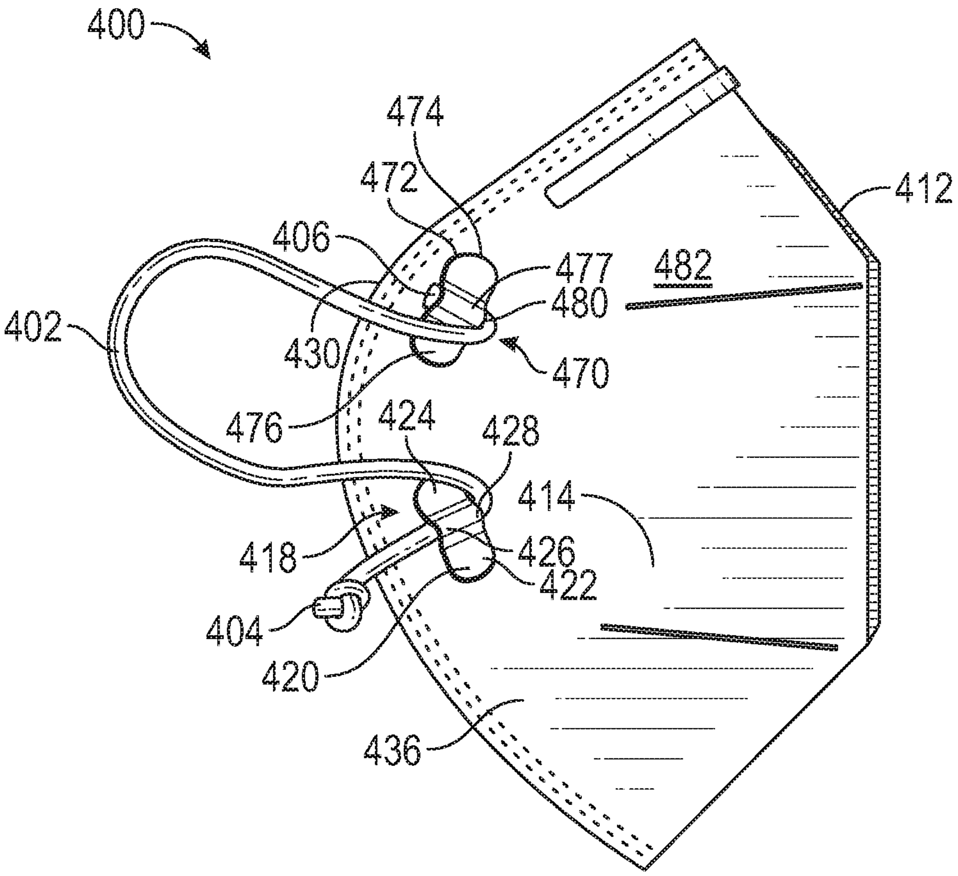
FIG. 9 is a schematic side view of another embodiment of a respirator.
Figure 10:
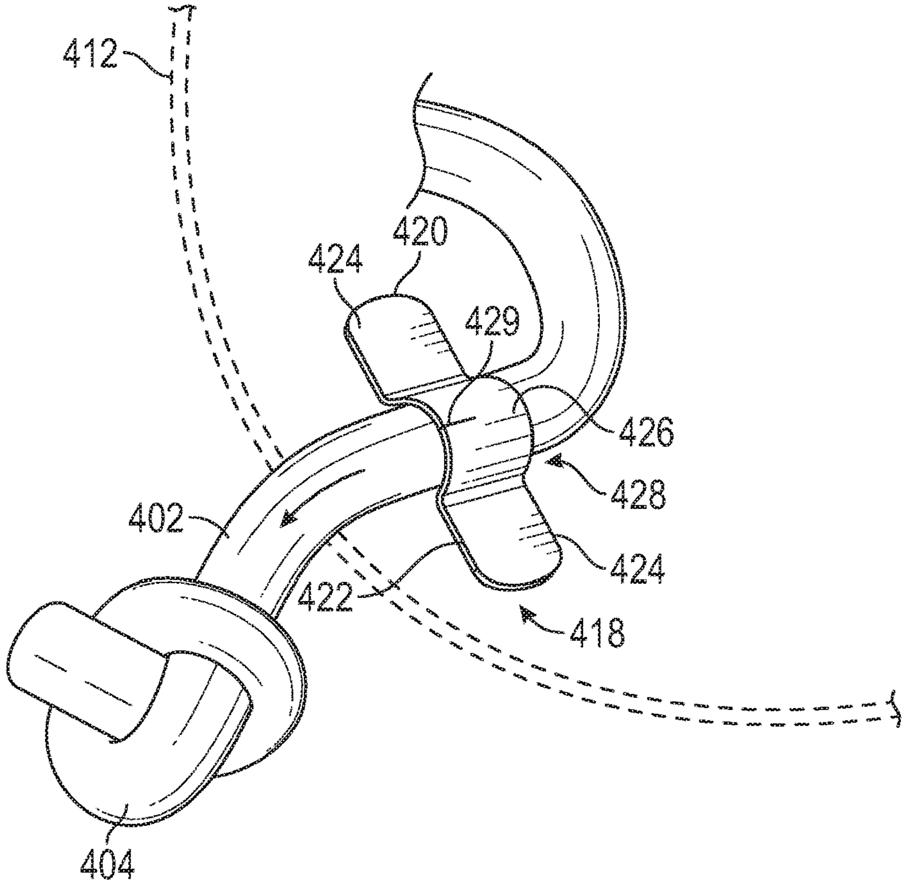
FIG. 10 is a schematic perspective view of an attachment region of the respirator of FIG. 9.

As mentioned herein, one or more attachment regions can be disposed on or in a mask body of a respirator using any suitable technique or techniques. For example, FIGS. 9-10 are various schematic views of another embodiment of a respirator 400. All of the design considerations and possibilities regarding the respirator 10 of FIGS. 1-3 and the respirator 100 of FIG. 3 apply equally to the respirator 400 of FIGS. 9-10. The respirator 400 includes a mask body 412 that it includes a filtering structure 414. A first attachment region 418 and a second attachment region 470 are disposed on the mask body 412 using any suitable technique or techniques. Although depicted as including first and second attachment regions 418, 470 disposed on a left side 436 of the mask body 412, the respirator 400 can include additional attachment regions disposed on a right side (not shown) of the mask body. For example, a first strap 402 can be connected to the left side 436 of the mask body 412, and a second strap (also not shown) can be connected to the right side of the mask body using the same technique or techniques utilized to attach the first strap 402 to the mask body.

The attachment regions 418,470 can include any suitable attachment regions. In the embodiment illustrated in FIGS. 9-10, the first attachment region 418 includes a patch 420 and the second attachment region 470 includes a patch 472. The patch 420 includes a first end portion 422 and a second end portion 424, and the patch 472 of the second attachment region 470 also includes a first end portion 474 and a second end portion 476. The first and second end portions of each of the patches 422, 472 are connected to the mask body 412 using any suitable technique or techniques. Each of an unattached central portion 426 of patch 420, and an unattached central portion 477 of patch 472 forms an aperture 428, 480 between the respective patch and the mask body 412.

The respirator 400 also includes an adjustable strap 402 that includes a first end 404 and a second end 406. The first end 404 of the strap 402 is threaded through the aperture 428 of patch 420 such that the strap is connected to the attachment region 418 as the aperture mechanically retains the strap. Further, the second end 406 of the strap 402 is threaded through the aperture 480 of the patch 472 such that the strap is connected to the second attachment region 470 as the aperture mechanically retains the strap.

The first and second attachment regions 418, 470 can be disposed in any suitable locations on the mask body 412. In one or more embodiments, one or both of the first and second attachment regions 418, 470 can be disposed adjacent a perimeter 430 of the mask body. Further, in one or more embodiments, one or both of the first and second attachment regions 418, 470 can be disposed outside of a breathable zone 482 of the mask body 412 such that the attachment regions do not block one or more portions of the breathable zone.

The patches 420, 472 can include any suitable material or materials, e.g., spun bond polypropylene (SBPP), nonwoven material with a typical basis weight, e.g., of 80-200 gsm, plastic sheeting or film, non-injection molded plastic materials, and other plastic materials. In one or more embodiments, one or both of the patches 420, 472 can include a non-woven material. The patches 420, 472 can take any suitable shape or shapes and have any suitable dimensions. Further, the patches 420, 472 can be connected to the mask body 412 using any suitable technique or techniques, e.g., adhering, mechanically fastening, welding, ultrasonically welding, etc. In one or more embodiments, one or both of the patches 420, 472 can be welded to the mask body 412. In one or more embodiments, one or both of the patches 420, 472 can be mechanically connected to the mask body using, e.g., a fastener.

FIG. 10 is an enlarged view of a portion of the respirator 400 that shows the attachment region 418 disposed on the mask body 412. As can be seen in FIG. 10, the first end 404 of the strap 402 is threaded through the aperture 428 formed by the unattached central portion 426 of the patch 420. In one or more embodiments, the patch 420 can include a gripping portion that is adapted to mechanically retain the strap 402. For example, in one or more embodiments, the patch 420 can include a textured surface disposed on an inner surface of the unattached central portion 426 such that the textured surface mechanically retains the strap within the aperture 428. Further, in one or more embodiments, a slit or notch 429 can be formed in the unattached central portion 426 such that the strap 402 engages the slit and mechanically retains the strap. The slit 429 can take any suitable shape and have any suitable dimensions. Further, the slit 429 can be disposed in any suitable location on the patch 420.

Figure 11:
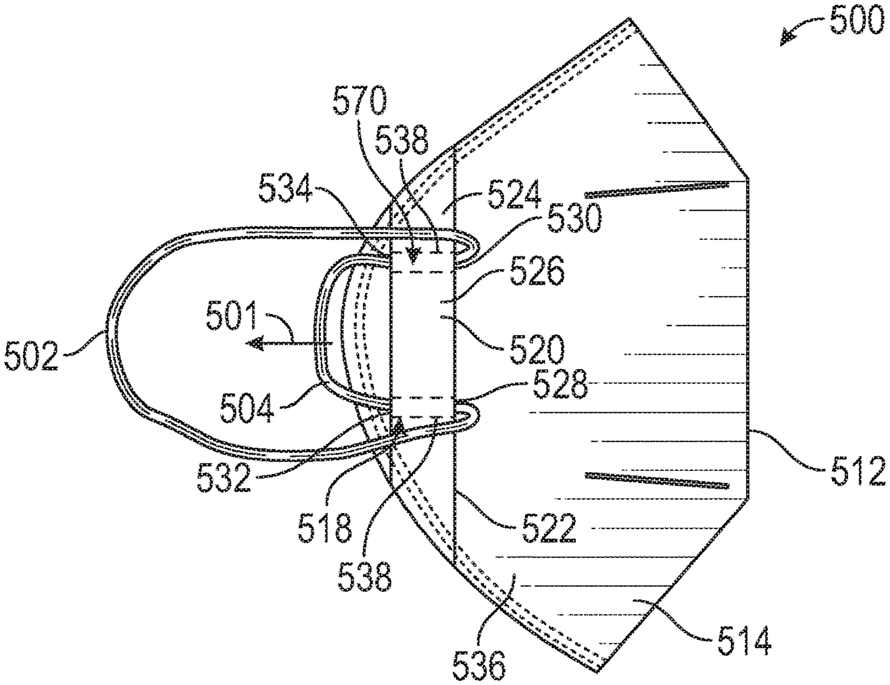
FIG. 11 is a schematic side view of another embodiment of a respirator.

The patches 420, 472 can either be discrete patches or a continuous patch that forms two or more apertures between the patch and the mask body 412. For example, FIG. 11 is a schematic side view of another embodiment of a respirator 500. All of the design considerations and embodiments regarding the respirator 400 of FIGS. 9-10 apply equally to the respirator 500 of FIG. 11. The respirator 500 includes a mask body 512 having a filtering structure 514, a first attachment region 518 and a second attachment region 570 disposed on a left side 536 of the mask body. Although depicted as including first and second attachment regions 518, 570 disposed on the left side 536 of the mask body 512, the respirator 500 can also include additional attachment region disposed on a right side (not shown) of the mask body.

The first and second attachment regions 518, 570 include a patch 520 that includes a first end portion 522 and a second end portion 524 that are connected to the mask body 512. The patch 520 also includes an attached central portion 526 that is also connected to the mask body 512. Further, the patch 520 includes a first unattached portion 528 and a second unattached portion 530. The first unattached portion 528 is disposed between the first end portion 522 and the attached central portion 526, and the second unattached portion 530 is disposed between the attached central portion and the second end portion 524. The first unattached portion 528 forms a first aperture 532, and the second unattached portion 530 forms a second aperture 534.

The first and second apertures 532, 534 can be formed using any suitable technique or techniques. For example, in one or more embodiments, one or more ultrasonic welds 538 can be formed in the patch 520 in any suitable pattern to provide the first and second apertures 532, 534. As shown in FIG. 11, the ultrasonic welds 538 include parallel lines that connect the patch 520 to the mask body 512 in portions adjacent the apertures.

The respirator 500 also includes an adjustable strap 502 that is connected to the first and second attachment regions 518, 570 such that the first and second apertures 532, 534 mechanically retain the strap. As shown in FIG. 11, the strap 502 is a continuous strap that is threaded through the first and second apertures 532, 534 using any suitable technique or techniques. In one or more embodiments, the strap 502 can be disposed on the mask body 512 of the respirator 500, and the patch 520 can be disposed onto the mask body and over portions of the strap such that the strap is disposed between the patch and the mask body as shown in FIG. 11. The first end portion 522, the central portion 526, and the second end portion 524 can be connected to the mask body 512 using any suitable technique or techniques. The respirator 500 can be snuggly fit on a face of a wearer by pulling a second end portion 504 of the strap 502 in the direction indicated by arrow 501 such that the respirator is pulled tightly against the face of the wearer.

Figure 12:
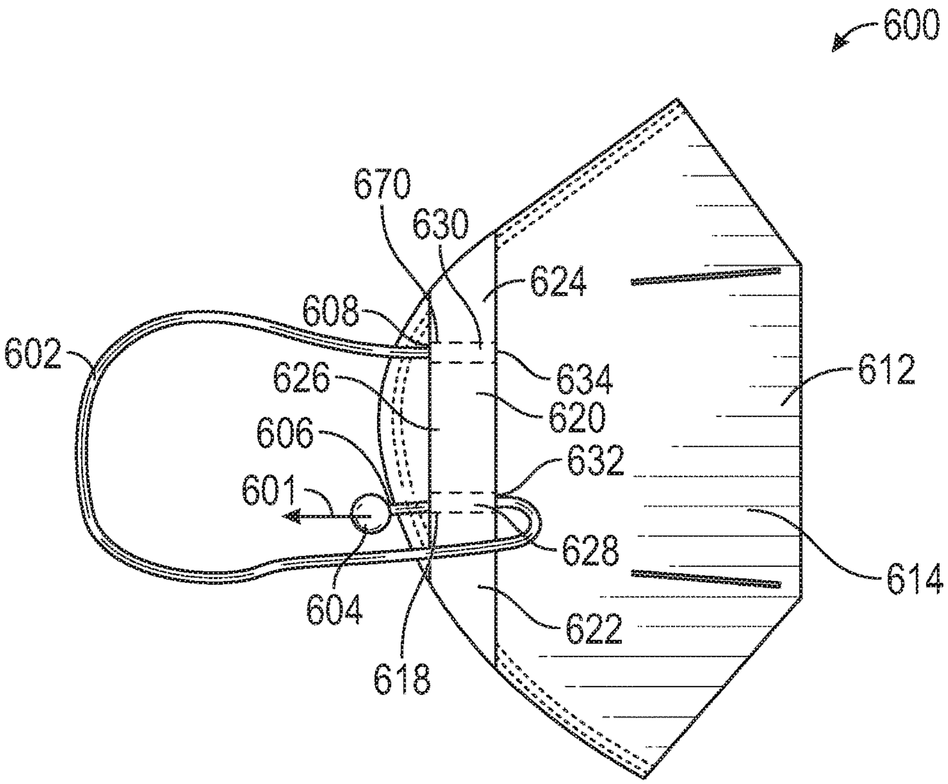
FIG. 12 is a schematic side view of another embodiment of a respirator.

The strap of the various embodiments of respirators described herein can be connected to mask bodies of the respirators using any suitable technique or techniques. For example, FIG. 12 is a schematic side view of another embodiment of a respirator 600. All of the design considerations and possibilities regarding the respirator 500 of FIG. 11 apply equally to the respirator 600 of FIG. 12. As shown in FIG. 12, the respirator 600 includes a mask body 612 having a filtering structure 614. The respirator 600 also includes a first attachment region 618 and a second attachment region 670 disposed on the mask body 612. The first and second attachment regions 618, 670 include a patch 620. The patch 620 includes a first end portion 622 and a second end portion 624. Each of the first and second portions 622, 624 are connected to the mask body 612. Further, the patch 620 includes an attached central region 626 disposed between the first and second end portions 622, 624. The attached central portion 626 is attached to the mask body 612 using any suitable technique or techniques. The patch 620 also includes first unattached portion 628 and second unattached portion 630. The first unattached portion 628 forms a first aperture 632, and the second unattached portion 630 forms a second aperture 634.

The respirator 600 further includes an adjustable strap 602 that is connected to the first and second attachment regions 618, 670 such that the first and second apertures 632, 634 mechanically retain the strap. The strap 602 includes a tab 604 disposed on a first end 606 of the strap. Further, the strap 622 includes a second end 608 that is connected to the attachment region 670 by the patch 620.

To adjust a length of the strap 602, the wearer or an assistant can pull on the tab 604 of the strap in direction 601 such that the strap is shortened, and the mask body 612 is pulled snugly against the face of the wearer. In one or more embodiments, the second end of the strap 608 can be threaded through the second aperture 634 and can also include a tab (not shown) such that the tab on the second end of the strap can also be pulled toward the face of the wearer to further tighten the strap. The second end 608 of the strap 602 can be connected to the mask body 612 using any suitable technique or techniques. In one or more embodiments, the second end 608 of the strap 602 is mechanically retained by the patch 620 within the aperture 634.

Figure 13:
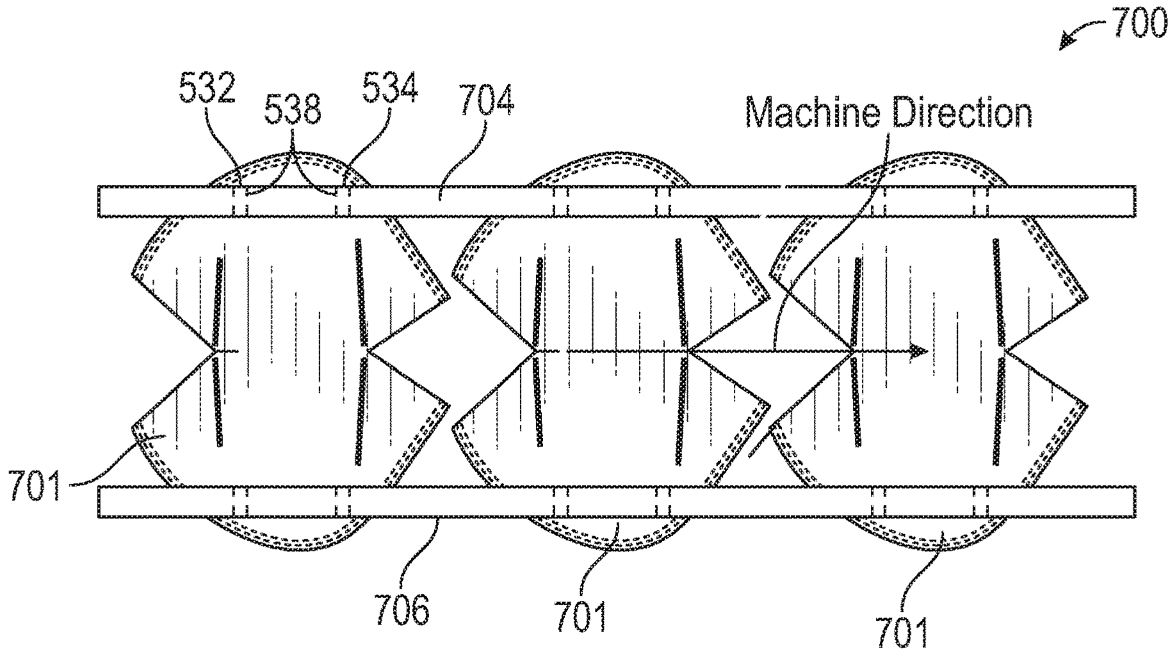
FIG. 13 is a schematic plan view of one embodiment of a method of forming a respirator.

The respirator 500 of FIG. 11 and the respirator 600 of FIG. 12 can be manufactured using any suitable technique or techniques. For example, FIG. 13 is a schematic plan view of one embodiment of a method 700 of forming the respirator 500 of FIG. 11. Although described in regard to respirator 500 of FIG. 11, the method 700 can be utilized to form any suitable respirator.

The method 700 includes forming a mask body blank 701 using any suitable technique or techniques. A buckle patch strip 704 can be connected to the mask body blank 701 using any suitable technique or techniques. In one or more embodiments, the buckle patch strip 704 can be connected to multiple mask body blanks 701 at the same time using any suitable technique or techniques. In one or more embodiments, the buckle patch strip 704 can be applied in a machine direction of a continuous process.

The buckle patch strip 704 can be connected to the mask body blank 701 to form one or more apertures 532, 534 between the buckle patch strip and the mask body blank using any suitable technique or techniques. As mentioned herein, one or more ultrasonic welds 538 can be formed between the buckle patch strip 704 and the mask body blank 701 to form the first and second apertures 532, 534. In one or more embodiments, a second buckle patch strip 706 can also be connected to the mask body blank 701 to form one or more additional attachment regions. The buckle patch strip 704 can be trimmed between mask body blanks 701 to provide the buckle patch 520 as shown in FIG. 11. Further, although not shown, the strap 502 can be threaded through the one or more apertures 532, 534 such that the strap is connected to the mask body blank 701. Further, each mask body blank 701 can be folded and connected together to form the mask body 512 as shown in FIG. 11 using any suitable technique or techniques, e.g., one or more of the techniques described in U.S. Pat. Nos. 6,484,722 and 6,568,392 to Bostock et al. In one or more embodiments, the strap 502 can be connected to one or both of the attachment regions 518, 570 either before or after the mask body blank 701 is formed into the mask body 512.

All references and publications cited herein are expressly incorporated herein by reference in their entirety into this disclosure, except to the extent they may directly contradict this disclosure. Illustrative embodiments of this disclosure are discussed and reference has been made to possible variations within the scope of this disclosure. These and other variations and modifications in the disclosure will be apparent to those skilled in the art without departing from the scope of the disclosure, and it should be understood that this disclosure is not limited to the illustrative embodiments set forth herein. Accordingly, the disclosure is to be limited only by the claims provided below.

What is claimed is:

1. A filtering face-piece respirator, comprising:
a mask body comprising a filtering structure, the filtering structure comprising one or more layers of filter media and one or more layers of cover web;
a flange extending from a perimeter of the mask body;
a first attachment region disposed on the filtering structure on the flange and outside a breathable zone of the mask body, the first attachment region comprising first and second linear welds in the filtering structure that define at least one elongated aperture; and
a first adjustable strap threaded through the at least one elongated aperture of the first attachment region such that welded edges adjacent the at least one elongated aperture comprise a gripping portion that frictionally and adjustably retains the first adjustable strap within the at least one elongated aperture.

2. The filtering face-piece respirator of claim 1 comprising:
a second attachment region disposed on the filtering structure adjacent to the perimeter of the mask body and comprising one or more apertures in the filtering structure, and
a second adjustable strap threaded through the one or more apertures of the second attachment region such that the one or more apertures of the second attachment region comprise a second gripping portion that adjustably retains the second adjustable strap.

3. The filtering face-piece respirator of claim 2, wherein the first and second adjustable straps each comprise a first end and a second end, wherein:
the first end of the first adjustable strap is threaded through the one or more apertures of the first attachment region and the second end of the first adjustable strap is attached to the mask body; and
the first end of the second adjustable strap is threaded through the one or more apertures of the second attachment region and the second end of the second adjustable strap is attached to the mask body.

4. The filtering face-piece respirator of claim 3, wherein the mask body comprises a flange, wherein the first and second attachment regions are disposed on the flange.

5. The filtering face-piece respirator of claim 3, wherein the one or more apertures of the first and second attachment regions do not extend into a breathable zone of the mask body.

6. The filtering face-piece respirator of claim 3, wherein a circumference of the one or more apertures of the first and second attachment regions is less than a circumference of the first adjustable strap and a circumference of the second adjustable strap.

7. The filtering face-piece respirator of claim 2, wherein the mask body comprises a flange, wherein the first and second attachment regions are disposed on the flange.

8. The filtering face-piece respirator of claim 2, wherein the one or more apertures of the first and second attachment regions do not extend into a breathable zone of the mask body.

9. The filtering face-piece respirator of claim 2, wherein a circumference of the one or more apertures of the first and second attachment regions is less than a circumference of the first adjustable strap and a circumference of the second adjustable strap.

10. The filtering face-piece respirator of claim 1 comprising a second attachment region disposed on the filtering structure adjacent to the perimeter of the mask body and comprising one or more apertures in the filtering structure, wherein the first adjustable strap is threaded through the one or more apertures of the second attachment region such that the one or more apertures of the second attachment region comprise a second gripping portion that adjustably retains the first adjustable strap.

11. The filtering face-piece respirator of claim 10, wherein the mask body comprises a flange, wherein the first and second attachment regions are disposed on the flange.

12. The filtering face-piece respirator of claim 10, wherein the one or more apertures of the first and second attachment regions do not extend into a breathable zone of the mask body.

13. The filtering face-piece respirator of claim 10, wherein a circumference of the one or more apertures of the first and second attachment regions is less than a circumference of the first adjustable strap.

14. The filtering face-piece respirator of claim 1, wherein the mask body comprises a flange, wherein the first attachment region is disposed on the flange.

15. The filtering face-piece respirator of claim 1, wherein the one or more apertures do not extend into a breathable zone of the mask body.

16. The filtering face-piece respirator of claim 1, wherein a circumference of the one or more apertures of the first attachment region is less than a circumference of the first adjustable strap.

17. The filtering face-piece respirator of claim 1, wherein the first attachment region comprises a buckle that is integral with the mask body.

18. The filtering face-piece respirator of claim 1, wherein the first adjustable strap comprises a first end and a second end, wherein the first end of the first adjustable strap is threaded through the one or more apertures of the first attachment region and the second end of the first adjustable strap is attached to the mask body.

19. A method of forming a filtering face-piece respirator comprising disposing a first attachment region on a mask body of filtering face-piece respirator, wherein disposing the first attachment region comprises:

welding together two or more layers of a filtering structure of the mask body along first and second linear welds on a flange and outside a breathable zone to form a connected portion, and disposing at least one elongated aperture in the connected portion by providing a slit between the first and second linear welds;

threading a first adjustable strap through the at least one elongated aperture of the first attachment region such that welded edges adjacent the at least one elongated aperture frictionally and adjustably retain the first adjustable strap within the at least one elongated aperture.

* * * * *